(12) United States Patent
Wallace et al.

(10) Patent No.: US 6,643,705 B1
(45) Date of Patent: Nov. 4, 2003

(54) ROUTING OF ELECTRONIC MESSAGES USING A ROUTING MAP AND A STATEFUL SCRIPT ENGINE

(75) Inventors: Andrew J. Wallace, Bellevue, WA (US); Christopher J. Ambler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/280,919

(22) Filed: Mar. 29, 1999

(51) Int. Cl.[7] ............................................. G06F 15/173
(52) U.S. Cl. ...................................... 709/240; 379/219
(58) Field of Search ................................ 709/200–206, 709/217, 219, 230, 236, 238, 240, 241, 220, 250, 317; 707/100, 200; 379/118, 219, 221; 370/351, 94, 401, 339; 340/572

(56) References Cited

U.S. PATENT DOCUMENTS

| | | | |
|---|---|---|---|
| 5,165,023 A | * 11/1992 | Gifford | 710/317 |
| 5,627,517 A | * 5/1997 | Theimer et al. | 340/572 |
| 5,659,547 A | * 8/1997 | Scarr et al. | 714/4 |
| 5,666,490 A | * 9/1997 | Gillings et al. | 709/238 |
| 5,721,828 A | * 2/1998 | Frisch | 709/217 |
| 5,781,729 A | * 7/1998 | Baker et al. | 709/230 |
| 5,838,923 A | * 11/1998 | Lee et al. | 709/236 |
| 5,870,464 A | * 2/1999 | Brewster et al. | 379/219 |
| 5,948,069 A | * 9/1999 | Kitai et al. | 709/240 |
| 5,999,965 A | * 12/1999 | Kelly | 709/202 |
| 6,032,190 A | * 2/2000 | Bremer et al. | 709/238 |

OTHER PUBLICATIONS

Wei, The Design of the USC PIM Simulation (pimsim), 1995, usc.edu/pub/csinfo/tech–reports/papers/95–604.ps.Z.*
Masella et al, Precise Kinematic Positioning Experiments with a Low–Cost PTK GPS Enigine, IEEE 1998.*
Fichman, Finding Patterns in Sequences; http://www.gsia.cmu.edu/andrew/mf4f/work/acad99.pdf.*

* cited by examiner

Primary Examiner—Robert B. Harrell
Assistant Examiner—Thong Vu
(74) Attorney, Agent, or Firm—Workman Nydegger

(57) ABSTRACT

The present invention enables an electronic message to be distributed sequentially to selected recipients. The electronic message is associated with a routing map, which defines the route of the electronic message. The routing map includes a list of operations, at least some of which are implemented in script. A routing engine controls the current state and the state transition of the routing map while predefined routing objects assist in the manipulation and processing of the routing map. Routing maps are associated with folders and any electronic message dropped in the folder is associated with the routing map. The operations of the routing map are executed in a stateful manner in response to events occurring in the messaging system until the electronic message has been sequentially distributed to the intended recipients.

10 Claims, 5 Drawing Sheets

ROUTING OF ELECTRONIC MESSAGES USING A ROUTING MAP AND A STATEFUL SCRIPT ENGINE

BACKGROUND OF THE INVENTION

1. The Field of the Invention

The present invention relates to methods of routing electronic messages. Specifically, the present invention relates to methods for sequentially routing electronic messages to a series of recipients.

2. The Prior State of the Art

Practically all businesses today have a mail system permitting paper documents to be distributed to recipients sequentially. Consider the process of publishing an article in a journal. When an article is received from an author, it is placed in the mail system of the business. The article is first delivered to an editor who determines whether or not to publish the article. If the editor decides that the article should be published, it is sent to a proof reader. Otherwise, the editor rejects the article and it is returned to the author. Assuming that the article is to be published, the article is returned to the editor for review after it has been proofread. Finally, the article is sent to a layout department, where it is actually arranged and placed in the forthcoming publication. Paper documents are easily distributed to different persons in a sequential manner.

The sequential distribution of paper documents is usually successful, but has significant drawbacks, two of which are time and money. Consider a document that must move sequentially from a person in Los Angeles to a person in New York to a person in Miami and back to the person in Los Angeles. If overnight mail is used, the time required to complete this route is at least three days and probably more, and the cost can be substantial. Time and money are factors even when a paper document is sequentially delivered within a single business.

The growing ability of computers to transmit a document electronically appears to be the answer, but while a paper document can be sequentially distributed, general purpose electronic messaging systems have often not been capable of delivering an electronic message in a similar fashion. Rather, electronic messages can typically be sent to persons on distribution lists of varying complexity, but the electronic message is sent to those persons simultaneously rather than sequentially. Many electronic messaging systems simply do not have the capability to distribute an electronic message sequentially, even though many electronic messages must travel through the same stages and to the same persons as paper documents.

Some electronic messaging systems are capable of sequential, or workflow, distribution of messages, documents, and the like. For instance, many organizations in which an number of employees repeatedly perform specialized tasks with respect to documents have systems for electronically circulating the documents. Insurance companies that process insurance claims represent one example of this type of organization. Many insurance companies convert claim forms into computer-displayable documents, which are then sequentially distributed to different departments, each of which performs part of a defined claim adjudication process. These systems include one or a limited number of predefined workflow routes that guide the documents to sequential recipients in the organization. The routes are predefined by the software developer or vendor or are created by a system administrator. In any event, the routes defined in such messaging systems are not capable of being modified or created by users who might wish to sequentially distribute a message to recipients according to a route other than the predefined routes.

Still other messaging systems have workflow distribution capabilities, whereby a message can be distributed to recipients in series. In these workflow systems, routing instructions are attached to each message to be sequentially distributed. For instance, the routing instructions might specify that the message is to be sent to a recipient A, then to a recipient B, and finally to a recipient C. The message, along with the attached routing instructions, is sent first to recipient A. The client system of recipient A then processes the routing instructions such that the message is transmitted to recipient B. The client system of recipient B likewise executes the routing instructions and sends the message to recipient C. While this approach to workflow distribution of documents has reduced much of the time and cost otherwise associated with distribution of paper documents, it has several drawbacks. For instance, each recipient in the series, with the possible exception of the last recipient, is responsible for processing the routing instructions and forwarding the message to the next recipient. If the client is somehow incapable of processing the routing instructions, successive recipients may never receive the message. Moreover, if a message is lost or deleted, the accompanying routing instructions are also lost, and the message is not delivered to later intended recipients.

In view of the foregoing, there is a need in the art for a reliable workflow document distribution system that can replace conventional delivery of paper documents. It would be an advancement in the art to provide distribution systems that are flexible enough to allow routes to be defined by substantially any user that desires to do so. It would be advantageous if such workflow distribution systems did not rely on client systems to process routing instructions.

SUMMARY AND OBJECTS OF THE INVENTION

The present invention enables electronic messages to be distributed sequentially to recipients. According to the invention, work flow distribution of documents is achieved by establishing a hub and spoke topology within an email system. When a user initiates the sequential distribution of a message to multiple users, the message is transmitted from the user to the router, which corresponds to the hub of the hub and spoke model. The router then sends the message to the first recipient and waits for a response or for some other event that indicates that the message should then be sent to the second recipient. In this manner, the router sequentially sends the message to each recipient. Moreover, the routing instructions specifying the workflow route of the message are stored and executed at the router or at another central location, instead of being attached to the message and executed at client systems as had been practiced in conventional systems.

In one implementation of the invention, the routing instructions are encoded in a routing map and one or more associated scripts. The routing map is a state diagram defining the logic used to distribute the electronic message to sequential recipients. As a message is distributed to various recipients and responses thereto are evaluated, the distribution process advances from one state to the next in the routing map.

Execution of the activities defined in the routing map is performed intrinsically by a routing engine at the router or by the associated scripts. For instance, the routing map can define flow control activities, which generally define when and where the message is to be distributed. Flow control activities can be executed intrinsically by the routing engine. The routing map can also include evaluation or functional activities which are implemented by the associated scripts.

Distributing the routing instructions between the routing map and the associated scripts has several advantages. For example, the scripts can be written to perform any desired evaluation or functional activity without being limited to a particular routing map. As such, the scripts can be very flexible and readily modified. At the same time, the use of the routing map to control the execution of the sequence of the scripted functions maintains a rigorous structure in the routing instructions. Moreover, the routing maps can also be readily modified to define different workflow distribution processes without having to change the functional or evaluation activities defined by the scripts.

The routing maps and associated scripts can be user defined or default. User defined routing maps can be generated using an authoring tool that provides a graphical user interface or that otherwise simplifies the process of defining distribution routes to the extent that substantially any user who desires to define a route can do so. Routes can be saved to a folder, such that any electronic message dropped on the folder will be distributed according to the route. Alternatively, routes can be created and applied to single messages. The hub and spoke topology used with the invention allows the routing map and the associated scripts to be maintained and executed at the central router. This approach is in contrast to conventional systems in which routing instructions are attached to individual messages and transmitted to client systems. By managing the routing logic at a central location according to the invention, a defined distribution process can continue even if the message is lost by one of the recipients. Moreover, the invention does not rely on the capability of client systems to respond to sequential routing logic.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention addresses the need to distribute an electronic message to recipients in a prescribed or sequential manner. The present invention permits a user to select or create both a route and the recipients of the electronic message. The route is represented by a routing map, which includes logic necessary to execute the functions required to sequentially distribute the electronic message. The present invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
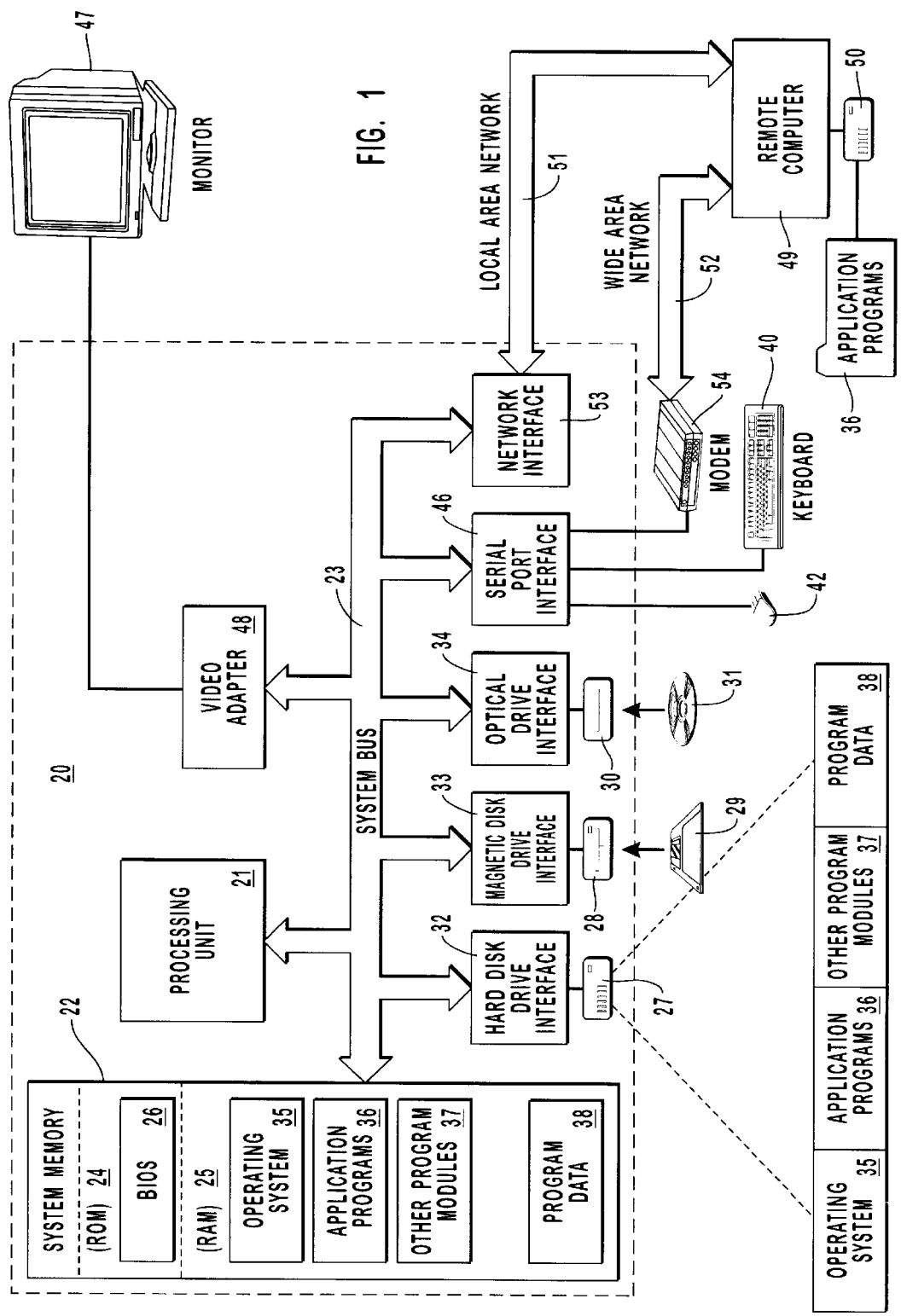
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2A:
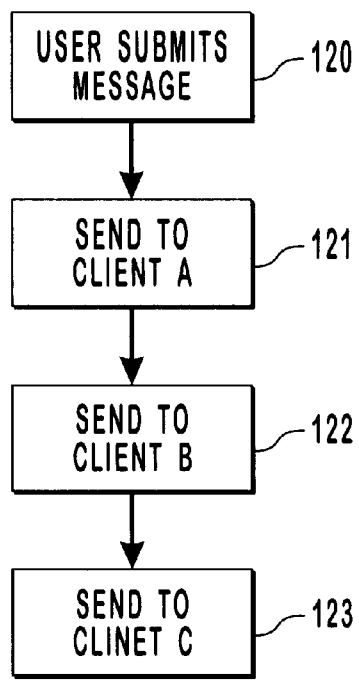
FIG. 2a is a graphical illustration of the logical path of a sequentially distributed electronic message.
Figure 2B:
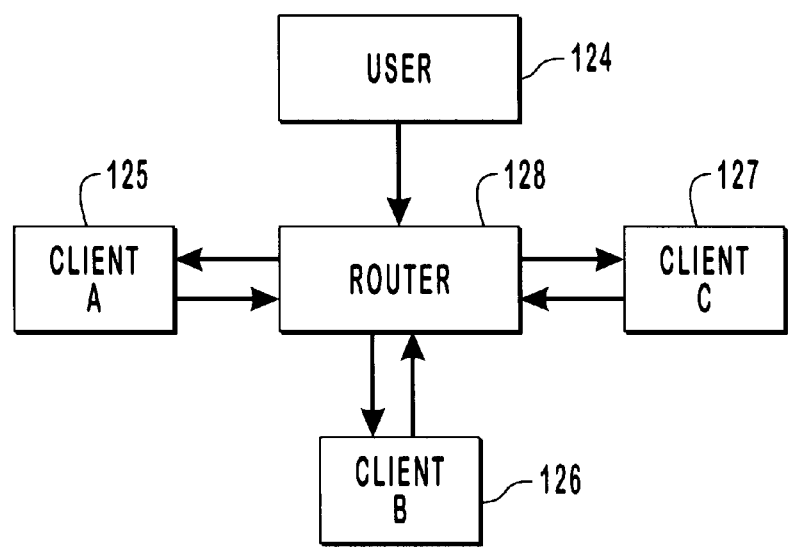
FIG. 2b is an graphical illustration of an actual path of a sequentially distributed electronic message.

The remaining diagrams, flow charts and illustrations relate to particular embodiments of the present invention. FIGS. 2a and 2b both illustrate the sequential distribution of an electronic message. FIG. 2a represents the logical path of an electronic message and is contrasted by FIG. 2b, which represents the actual path of the electronic message. The term "electronic message" refers to information that can be communicated between computers, including, but not limited to, emails, spreadsheets, documents, graphics, text, and computer files.

The logical view of the path of an electronic message in FIG. 2a begins with step 120, where a user creates or submits an electronic message which is to be sequentially distributed to various clients. The path depicted in FIG. 2a represents the order in which the recipients receive the electronic message, and does not show the entire path of the electronic message as it moves through the network environment. FIG. 2a depicts the route of the electronic message as it might be understood by the user sending the message. In particular, a user sending an electronic message merely needs to know the intended order of the recipients, and does not have to understand the actual path that the message will take as it moves from recipient to recipient. In step 120, the user indicates that the intended recipients are client A, client B and client C. The electronic message is first sent to client A in step 121, to client B in step 122, and finally, to client C in step 123. From the user's point of view, the electronic message simply travels from client A to client B to client C.

Note that each client can perform some act with regard to the electronic message before it is sent to the next client. The acts performed by the clients are typically related to the sequential distribution of the electronic message. For example, the user might submit an expense report to client A for approval in step 121. In step 122, the electronic message is then sent to client B in the accounting department. Finally, in step 123, the electronic document is sent to client C, who is responsible for archiving. The point is that the acts performed by the clients or intended recipients do not occur contemporaneously in this example, but instead occur sequentially. However, in other contexts, the user could specify that copies of an electronic message are to be sent to two or more recipients a the same time. The routing instructions by which the route of the electronic message is defined can be flexible enough to enable the message to be sent to recipients sequentially, simultaneously, or otherwise.

FIG. 2b illustrates the actual path taken by the electronic message as it is sequentially distributed by one embodiment of the present invention. Sequential distribution of the electronic message begins as a user 124 sends the electronic message to router 128. Router 128 contains the logic necessary to sequentially distribute the electronic message and is typically incorporated in a network server. Router 128 and the routing logic executed thereby will be described in greater detail below. Executing the sequential distribution of an electronic message from a network server or another central location as opposed to sending the routing logic to each recipient with the electronic message as has been conventionally practiced permits the routing logic to be efficiently managed and maintained. Router 128 sends the document to client A 125, which performs some act related to the electronic message. The electronic message is later returned to router 128. Router 128 next sends the electronic message to client B 126, which might also perform some act related to the electronic message. After client B transmits the electronic message to router 128, the message is sent to client C 127. Client C 127 can perform an act related to the electronic message and transmit the message to router 128. Upon receiving the electronic message from client A 125, client B 126, and client C 127, router 128 can perform any designated analysis or processing steps on the message, including responding to any acts performed on the message by the various recipients.

The hub and spoke architecture of the messaging system illustrated in FIG. 2a allows the route selected by the user to be efficiently executed and managed. Because the routing logic is stored and executed at router 128 according to one embodiment, the routing logic is not subject to being lost or otherwise interrupted regardless of the nature of the recipients. For instance, if client A 125 fails to respond or loses the electronic message, the routing logic remains at router 128, and a copy of the electronic message can be delivered to the other recipients if desired. Moreover, the router can deliver the electronic message to clients 125, 126, and 127 or to other clients in any order, whether in series, in parallel, or otherwise, based on the routing logic used or defined by user 124.

Figure 3:
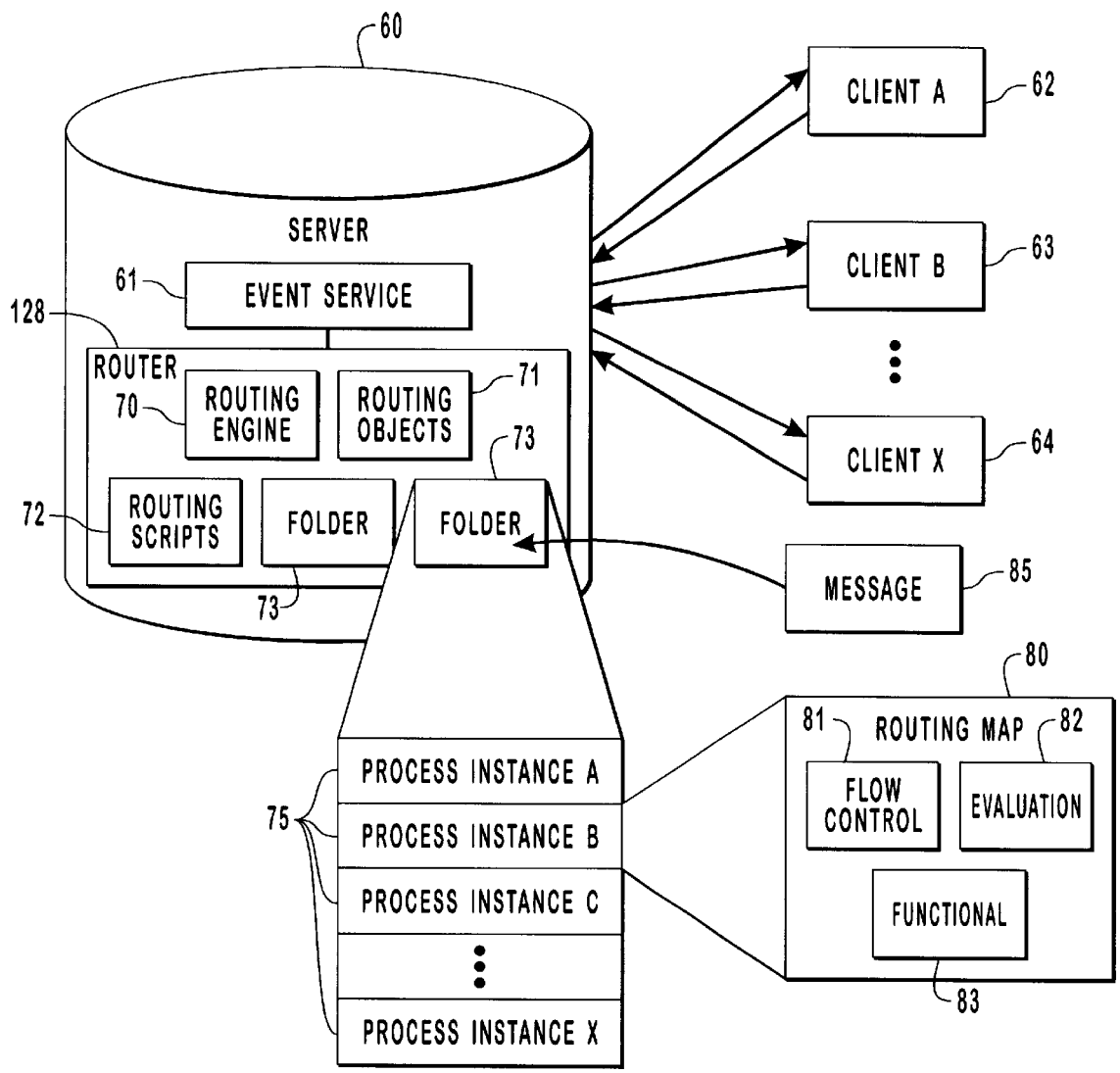
FIG. 3 is a diagram illustrating one embodiment of a system implementing the modules and methods of the present invention.

FIG. 3 illustrates the components of one embodiment of the present invention which enable an electronic message to be sequentially distributed. In this embodiment the routing logic, or routing instructions, are encoded in and distributed among a routing map 80, a routing engine 70, and routing scripts 72. Distributing the routing instructions among these components of the system allows the instructions to be efficiently executed, while permitting the instructions to be easily modified and adapted to perform substantially any desired messaging route.

In order to sequentially distribute an electronic message, the route or path of the electronic message is defined. The creation of a route and the means to execute the route are illustrated in FIG. 3. Router 128 is implemented on network server 60, which has a plurality of clients 62, 63, and 64, some of whom may receive the distributed electronic message. All the clients who receive the electronic message need not reside in the network directly served by server 60. Router 128 on server 60 can distribute an electronic message to clients in different domains, such that any client having a messaging address (e.g., an email address) can be included in the route.

Routing map 80 is a low-level description of the route of the electronic message, and can be described as a scripting agent that selectively initiates the operation of routing scripts 72, which perform functions such as sending and evaluating messages. Routing map 80 defines a series of states that are sequentially entered into as the electronic message advances through the route. Each state of the routing map can be associated with an activity or function which, as shown in FIG. 3, can be classified into three groups: flow control activities 81, evaluation activities 82, and functional activities 83. These groups of activities will be described in greater detail below. The activities defined in the routing map are executed either intrinsically by routing engine 70 or by routing scripts 72.

Routing map 80 controls the timing of execution of routing scripts 72, and can also control which routing scripts 72 or portions thereof are to be executed. As a scripting agent, routing map 80 provides a rigorous structure that controls the execution of the routing scripts 72. This structure, or framework, allows the routing scripts to be relatively simple and also permits the scripts to be readily modified to adapt to any desired route or to perform any desired operations of messages as they are sent through the route. Moreover, the states described in routing map 80 can be modified independent of routing scripts 72, further providing flexibility to the system.

Flow control activities 81 refer to the creation or termination of process instances, to state advancement processes whereby routing map 80 advances from one state to the next, and to related activities. In this context, a process instance (e.g., process instances 75) represents a message being monitored as it advances through its route. Flow control activities 81 are generally those that can be intrinsically executed by routing engine 70. Thus, when the current state of routing map 80 is associated with a flow control activity 81, routing engine 70 is prompted to execute the particular flow control activity.

Evaluation activities 82 include operations that evaluate or analyze a message or acts made with respect to the message by recipients. For example, routing map 80 might define a process whereby a recipient is to approve or reject a proposal included in a message. An evaluation activity included in the routing instructions encoded in routing map 80 could be used to determine whether the response to the message has been an approval or a rejection. Evaluation activities 82 are generally performed by executing an appropriate routing script 72. Thus, when the current state of routing map 80 is associated with an evaluation activity 82, an appropriate routing script 72 is executed. In this manner, routing map 80 is a scripting agent that controls the execution of an associated routing script 72. The routing map 80 does not need to define the details of how evaluation is to be conducted; these details are included in the associated routing script. Furthermore, the associated routing script 72 can be readily edited to perform any desired evaluation without modifying the routing map 80. Each routing script 72 can be associated with as many routing maps 80 as desired. This feature of the invention allows routes and evaluation activities to be conveniently defined and efficiently executed. Routing scripts 72 can be written in any suitable language, examples of which include VBScript and JavaScript.

Functional activities 83 represent operations whereby messages are sent, received, or otherwise routed between elements of the network environment. Like evaluation activities 82, functional activities are generally performed by executing an appropriate routing script 72. Accordingly, routing map 80 is used to indicate when a message is to be sent or to monitor when a message is received. However, the acts of sending the electronic message and receiving the message are performed by the routing scripts 72 associated with the routing map 80. The classifications of flow control activities 81, evaluation activities 82, and functional activities 83 are presented for illustration purposes, and should not be construed to limit the scope of the invention. The invention extends to any other types of activities that could be conducted with respect to an electronic message.

FIG. 3 further illustrates other components of this embodiment, which are used with the routing map 80, routing engine 70, and routing scripts 72 to execute the messaging routes. In this embodiment, server 60 has an event service 61 that fires, or delivers, notification of events to router 128 upon the occurrence of specified events or actions in the messaging system. For instance, event service 61 can deliver notification of the receipt of a message, of the passage of a specified length of time, and the like. The events delivered by event service 61 can be used to advance routing map 80 from one state to another according to specified criteria.

Router 128 can also include routing objects 71, which are defined to assist in the manipulation of routing map 80 and to simplify the routing instructions. Folders 73 can be used to store routing maps 80 and to facilitate the process of associating routes with messages. For example, a user can place or drop a message 85 in one of folders 73, thereby indicating that the routing map 80 and the associated routing instructions stored in the selected folder 73 are to be used to route the message. Any folder 73 can simultaneously assist in the process of routing multiple messages, as indicated by the plurality of process instances 75 depicted in FIG. 3. A process instance 75 can be defined as an instance of applying a routing map and the associated routing instructions to a specific message 85.

In view of the foregoing general description of how routing instructions can be encoded in a distributed fashion among routing map 80, routing scripts 72, and routing engine 70, a specific example of a route will now be presented for illustration purposes. It should be understood that the route of this example and the specific computer-executable instructions in which it is encoded are not to limit the scope of the invention. The invention extends generally to messaging systems or methods in which a messaging route is executed using a routing map and an associated routing script as described herein.

In this example, assume that a proposal is to be sent from an author to a manager for approval. The desired route for the electronic message that includes the proposal could be articulated by the sender (i.e., author) according to the following natural language expression:

1) Send message to manager;
2) Wait for either a response or for 24 hours;
3) Determine whether 24 hours have elapsed;
4) If 24 hours elapse, begin execution of a timeout handling module;
5) If 24 hours do not elapse, manager has returned message;
6) Open message and collect approval status;
7) Evaluate whether the proposal is approved;
8) If approved, begin execution of an approval handling module; and
9) If not approved, begin execution of a rejection handling module.

In this manner, the sender has identified a desired route for the message, including the intended recipients and any analysis to be preformed on the message after the recipients have acted on the message. Again, it is noted that the route described above is presented merely to illustrate any number of routes that can be used with the invention.

Having identified the desired route, the sender then constructs routing instructions that describe the route and which are distributed among the routing map 80, the routing engine 70, and the routing scripts 72. Any desired technique can be used for converting the intended route to routing instructions capable of being executed by router 128. For instance, the software developer or vendor can include any number of pre-defined routes. Alternatively, the sender can actively modify existing routes or create new routes. For example, the systems of the invention can include a route authoring tool that allows the sender to conveniently encode routing instructions using a graphical or text-based interface.

According to this embodiment, routing map 80, in which the routing instructions are partially encoded, is an executable data structure that transitions from state to state as the activities associated with sending the electronic message through its route are performed.

The specific example of obtaining a manager's approval for a proposal can be applied to generate the following routing map:

| Routing Map A | | |
|---|---|---|
| Operation ID | Operation | Argument |
| 10 | Send | Manager |
| 20 | Wait | 24 hours |
| 30 | ORSplit | IsTimeout |
| 40 | Goto | Timeout |
| 50 | Receive | |
| 60 | ORSplit | IsApprove |
| 70 | Goto | Approved |
| 80 | Goto | Rejected |

It noted that the specific syntax, structure, and content of routing map A and the associated routing instructions are presented as an example of how the invention can be applied to a specific messaging route, and should not be construed as limiting the scope of the invention. In this example, routing map A is a table that includes fields designated as "Operation ID", "Operation", and "Argument." The Operation ID field is populated by a sequential, numeric reference to the associated Operations and Arguments. The entries in the Operation field represent discrete activities or functions associated with the route. The entries in the Argument field represent values that are to be used in conjunction with the associated script or the other executable code to perform the designated operation.

Referring to routing map A, the operations "send" and "receive" are functional activities 83. "Wait" is a flow control activity 81 that causes the routing map to maintain its current state (i.e., the state referenced by Operation ID 20) until the 24 hours have elapsed. "Goto" is a flow control activity 81 that causes the routing process to execute a routing script 72 designated, for instance, as "Approved" or "Rejected". "ORSplit" is a flow control activity 81 that causes the state of routing map 80 to advance one or two entries, depending on the results of an evaluation activity defined in the associated Argument field. If the evaluation activity returns a true value, the state advances one line; otherwise the state advances two lines. For instance, the "ORSplit" activity at line 30 of routing map A causes the state of the routing map to advance to either line 40 or line 50 based on the results of the associated "IsTimeout" activity. In this example, if the "IsTimeout" activity determines that a timeout event has occurred upon the passage of 24 hours, the state of routing map A advances one line to line 40. Otherwise, the state of routing map A skips line 40 and advances to line 50. In this example, the activities "IsTimeout" and "IsApprove" are evaluation activities 82 that cause the appropriate routing script 72 to be executed.

As a message is sent through its route, the routing map is traversed as it advances from state to state. Advancement from one state to the next is triggered by the receipt at router 128 of a specific event from event service 61. For instance, routing map A advances from the state associated with line 10 to the state associated with line 20 when event service 61 indicates that the act of sending the message to the manager has been performed.

Distributing the routing instructions among the routing map 80 and the routing scripts 72 simplifies the process of modifying or adapting the routing instructions to new routes. Referring to the foregoing example, assume that the sender wants to forward the message to a marketing department if the proposal is approved. To do so, the sender could change line 70 of routing map A by replacing "Goto" and "Approved" with "Send" and "Marketing". If a routing script 72 for sending a message to the marketing department already exists, the new recipient (i.e., the marketing department) has been designated by changing routing map A without composing a new script. Similarly, if the sender wants to modify the process by which the system determines whether the proposal has been approved, the sender can make this change by editing the routing script 72 associated with the "IsApprove" activity without modifying routing map A.

Figure 4:
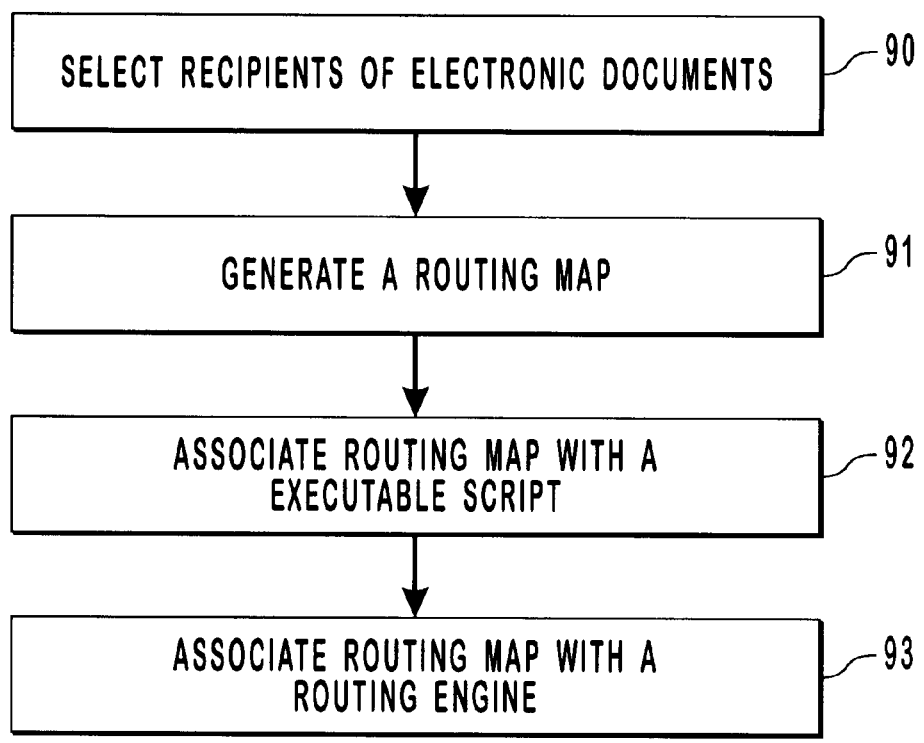
FIG. 4 is a flowchart of one embodiment of a method for generating the sequential route to be taken by an electronic message.

FIG. 4 is a flow diagram illustrating one embodiment of the methods for establishing a route by which a message is to be sequentially sent to recipients and for encoding the route in routing instructions. In step 90, the sender selects the recipients of the message. The recipients can be referred to as participants because they participate in the route of the electronic message and as clients because they are often served by a network server at which the router resides.

A routing map is generated in 91 according to techniques described herein. For instance, the routing map can be a default or pre-defined map that has been constructed by the vendor or the developer of the routing software. Alternately, the routing map can be customized for a particular route by the user or another authorized person using, for example, a route authoring tool. The routing map is associated with the appropriate routing scripts in step 92. The routing scripts can also be default or pre-defined scripts or can be customized by the user another authorized person. In step 93, the routing map is associated with a routing engine.

Figure 5:
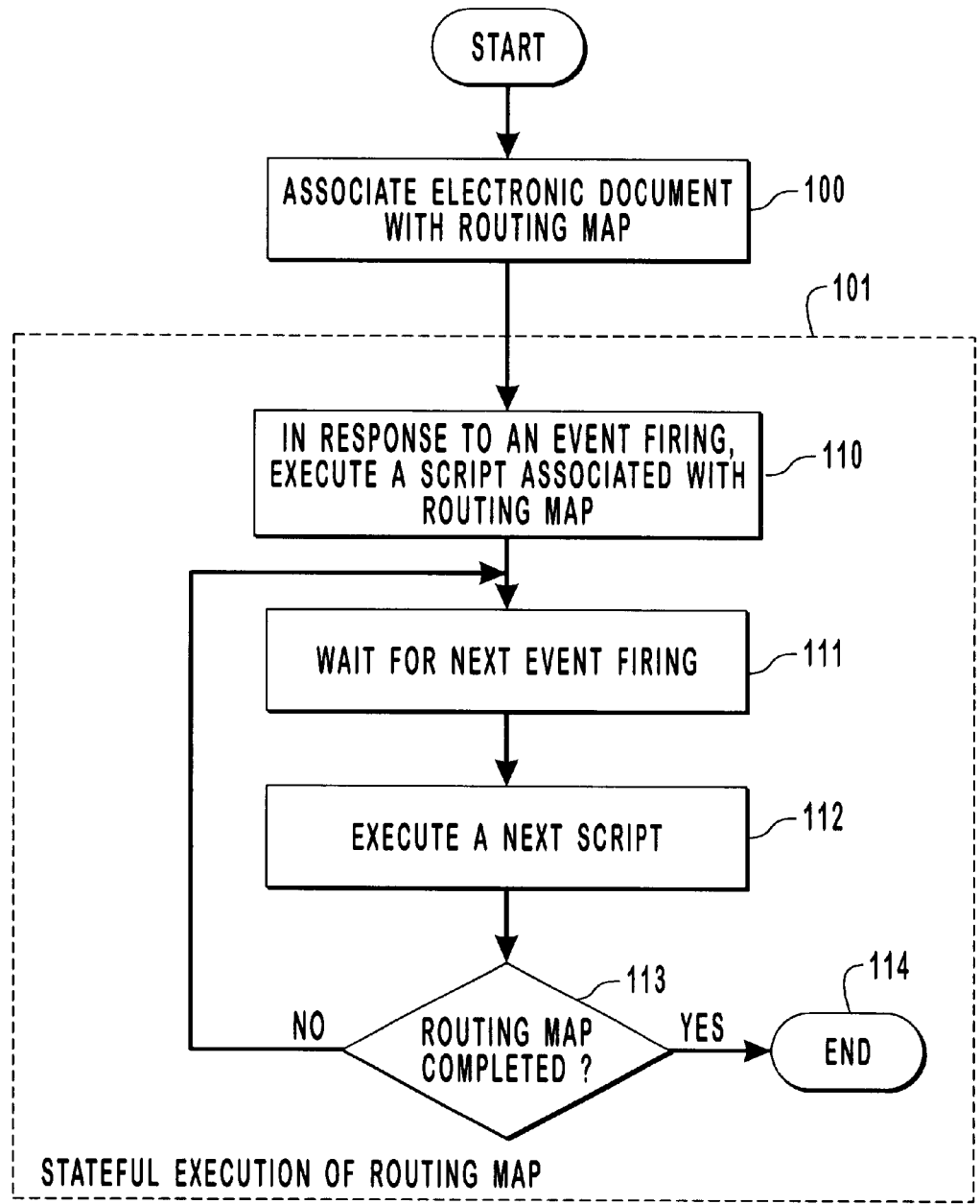
FIG. 5 is a graphical representation of one embodiment of a method for executing a sequential route defined by a routing map.

FIG. 5 is a flow diagram illustrating one embodiment of a method of delivering an electronic message to two or more recipients sequentially. In step 100, the electronic message is associated with a routing map. Step 100 can be performed in a variety of ways. For example, the routing map and a folder can be created at the same time such that any subsequent electronic message inserted in the folder will be associated with the same routing map. A routing map can be created and associated with an already existing folder and any subsequent electronic messages inserted in that folder will be associated with the routing map. Alternatively, a selected routing map can be associated with the electronic message before the message is placed in a folder. In this case, any default routing map stored in the folder will be overridden by the selected routing map.

Once the electronic message is associated with a routing map and a process instance is formed, the routing map is executed in a "stateful" manner. In other words, the routing map advances from one state to the next in response to events delivered by the event service, thereby defining which scripts are to be executed and the timing of the script execution. This stateful execution of the routing map is depicted generally at 101 in FIG. 5. In the case of a newly inserted electronic message, the routing engine will note that a new electronic message has been inserted in the folder and the activity associated with the first state of the routing map will be executed in step 110. A script associated with an activity in the routing map is executed in response to a fired event in step 110. Recall that the routing map has routing logic which is typically a series of operations or activities. Each operation is represented by a script stored separately from the routing map or is intrinsically performed by the routing engine. Using the above example, the first operation of the routing map is "Send," which has an operation ID of 10 and an argument of "Manager." The activity "Send" is represented by a script that sends the electronic message to the designated recipient. After completing or executing the script, step 111 waits for the next event firing, which occurs when the event service detects a change in the folder. After an event fires, step 112 executes the next script. If the routing map is completed according to decision block 113, the process terminates; otherwise, steps 111 and 112 are repeated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a server system included in a messaging system, wherein the messaging system further includes a plurality of client systems and wherein the server system has an event service generating events in response to activity of the messaging system, a computer readable medium having computer-executable components comprising:

a plurality of electronic messaging folders, wherein each electronic messaging folder contains a routing map, the routing map having routing logic defining a route by which an electronic message can be sequentially distributed to two or more recipients in series, one after the other in a designated order;

an executable script stored on the server system, wherein the executable script is associated with the routing map and stored separately from the routing map; and a routing engine configured on a per folder basis, the routing engine being capable of controlling the execution of the routing logic of each routing map in each folder in response to events generated by the event service, whereby the routing logic, when executed, sequentially distributes the electronic message to the two or more recipients in series, one after the other in the designated order.

2. A computer-readable medium as defined in claim 1, wherein the computer-executable components further comprise a set of routing objects that assist the routing engine in the execution of the routing logic.

3. A computer-readable medium as defined in claim 1, wherein the computer readable medium further has computer-executable instructions that, when executed by one or more processors of a computing system, cause the computing system to detect a designation of the two or more recipients of the electronic message.

4. A computer-readable medium as defined in claim 1, wherein the computer readable medium further has computer-executable instructions that, when executed by one or more processors of a computing system, cause the computing system to receive user input that results in composing the executable script.

5. A computer-readable medium as defined in claim 1, wherein the computer readable medium further has computer-executable instructions that, when executed by one or more processors of a computing system, cause the computing system to access the executable script.

6. A computer-readable medium as defined in claim 1, wherein the routing map comprises a plurality of entries, each representing a state at which a process of routing the message can reside, each of the entries referencing one of a series of operations.

7. A computer-readable medium as defined in claim 1, wherein the routing map comprises a plurality of entries, wherein each of the entries includes:

- a first data field containing an operation identifier that uniquely identifies the particular entry;
- a second data field containing data representing one of a series of operations; and
- a third data field containing an argument, wherein:
    - if said one of the series of operations is to be performed by the executable script, the argument is passed to the executable script when the routing map is executed; and
    - if said one of the series of operations is to be performed by the routing engine, the argument is passed to the routing engine when the routing map is executed.

8. A computer-readable medium as defined in claim 1, wherein the computer readable medium further has program code means for selecting a sequence of the two or more recipients who are to receive the electronic message in series, one after the other in the designated order.

9. A computer-readable medium as defined in claim 1, wherein the computer readable medium further has program code means for sequentially distributing the electronic message in series, one after the other in the designated order.

10. A computer-readable medium as defined in claim 1, wherein the computer readable medium further has program code means for managing state transitions of the routing map.

* * * * *

UNITED STATES PATENT AND TRADEMARK OFFICE
CERTIFICATE OF CORRECTION

PATENT NO. : 6,643,705 B1
DATED : November 4, 2003
INVENTOR(S) : Andrew J. Wallace and Christopher J. Ambler It is certified that error appears in the above-identified patent and that said Letters Patent is hereby corrected as shown below:

Column 1,
Line 55, after "which" please delete "an" and insert -- a --

Column 4,
Line 1, after "FIG. 2b is" please delete "an" and insert -- a --

Column 6,
Line 64, after "recipients" please delete "a" and insert -- at --

Signed and Sealed this

Fifteenth Day of June, 2004

JON W. DUDAS
*Acting Director of the United States Patent and Trademark Office*